United States Patent [19]

Gordon et al.

[11] Patent Number: 4,620,981

[45] Date of Patent: Nov. 4, 1986

[54] PROCESS FOR PREPARING A HIGHLY EXPANDED OAT CEREAL PRODUCT

[75] Inventors: Warren A. Gordon, Buffalo Grove; Walter L. Hempenius, Cary; James R. Kirkwood, Arlington Heights, all of Ill.

[73] Assignee: The Quaker Oats Company, Chicago, Ill.

[21] Appl. No.: 622,309

[22] Filed: Jun. 19, 1984

[51] Int. Cl.[4] .......................... A23L 1/18; A23L 1/10; A21D 6/00; A21D 8/00

[52] U.S. Cl. .................... 426/448; 426/449; 426/450; 426/458; 426/465

[58] Field of Search ............... 426/430, 446, 448, 449, 426/450, 436, 457, 458, 465

[56] References Cited

U.S. PATENT DOCUMENTS

| | | | |
|---|---|---|---|
| 2,552,290 | 5/1951 | Lilly | 426/457 |
| 2,552,291 | 5/1951 | Rupp | 426/457 |
| 2,554,873 | 5/1951 | Musher | 426/436 X |
| 2,653,095 | 9/1953 | Baer | 426/449 |
| 3,054,677 | 9/1962 | Graham, Jr. et al. | 426/448 X |
| 3,246,990 | 4/1966 | Thompson et al. | 426/446 X |
| 3,579,352 | 5/1971 | Bookwalter et al. | 426/448 X |
| 4,028,468 | 6/1977 | Hohner et al. | 426/436 |
| 4,208,259 | 6/1980 | Oughton | 426/436 |
| 4,211,801 | 7/1980 | Oughton | 426/430 |

*Primary Examiner*—David M. Naff
*Attorney, Agent, or Firm*—Daniel W. Latham

[57] ABSTRACT

A method is disclosed for making a highly expanded, porous oat cereal product having a density of below about 12 ounces per 121.5 cubic inches comprising the steps of:

a. classifying an oat flour to separate out a low $\beta$-glucan oat flour with a $\beta$-glucan content of less than about 3.3%, b. cooking a mix comprising the low $\beta$-glucan oat flour wherein the low $\beta$-glucan oat flour comprises at least about 55% of cereal flour in the mix, c. expanding and shaping the cooked mix into a shaped cereal product, d. heat setting the shaped cereal product, and e. drying the heat seat cereal product to a moisture content at which it is structurally stable.

7 Claims, 3 Drawing Figures

PROCESS FOR PREPARING A HIGHLY EXPANDED OAT CEREAL PRODUCT

BACKGROUND OF THE INVENTION

In the marketplace for ready-to-eat cereals or snacks, products with a light, crisp texture have become very popular. This is especially true with respect to ready-to-eat cereals based on crisp rice and snack products based on crisp corn. The ready to eat cereals have excellent crispness retention in milk, excellent organoleptic characteristics, and a low density that makes possible the use of large, appealing packages. It is possible that an oat based cereal or snack product of this type could also find consumer acceptance.

Manufacture of crisp, light cereal products is typically undertaken by expanding whole grains or cereal flour mixtures using two principal methods. First, a sudden release of pressure on a cooked whole grain or cooked cereal flour can cause substantial expansion by allowing entrapped gases and superheated liquids within the cereal to expand rapidly. Gun puffing and extrusion puffing in which the cereal is first subjected to superatmospheric pressure and then released to atmospheric or subatmospheric pressure are typical methods of expansion by release of pressure. Second, application of heat to cooked whole grain or cooked cereal flour mixtures can also result in substantial expansion by sudden vaporization of liquids and expansion of gases entrapped within the cereal. Typical methods for expansion of cereals by heating include immersion of the cereal in hot oil or introduction of the cereal into a hot airstream.

Many cereals are easily expanded. For example, if corn, wheat, or rice flours are expanded by extrusion from a cooker-extruder and are cut and then dried, a crisp, porous product with a stable low density structure is produced. A typical shape for such highly expanded cereals is an irregular nugget shape about 3/16 to 5/16 inch in diameter. Typical densities for these products when extruded under heat and pressure at a 20% moisture content are in the range of 4 to 8 ounces in a box volume of 121.5 cubic inches. Maximum expansion of these corn, wheat and rice cereals typically requires a low moisture content, generally in the 12 to 20% range, combined with a high temperature of extrusion, generally well above 300° F.

Until now, problems in making a highly expanded crisp oat product have prevented its commercial production. For example, oat flour processed at the 20% moisture conditions described above produces a product which is hard and substantially unexpanded with a density of about 15–20 ounces for a box volume of 121.5 cubic inches. It has been observed that low moisture oat flour mixtures expand normally as they issue from an extrusion die but undergo a sudden collapse immediately following extrusion.

This amount of expansion makes an unacceptable product from a consumer and marketing viewpoint. It has been determined that consumers prefer a light, crisp product with a substantially lower density. Although product densities in the range of 4 to 8 ounces per 121.5 cubic inches are preferred by consumers, cereal products with a density as high as about 12 ounces per 121.5 cubic inches could also find consumer acceptance.

As a result of the difficulties of oat flour expansion, the only types of low density oat flour cereal products currently available are hollow pillow or biscuit shapes as described, for example, in U.S. Pat. No. 3,054,677 issued to Graham et al. Graham describes a method for making a pillow shaped cereal in which an oat flour mix is extruded under heat and pressure into adjacent strands which expand as they issue from the die, thereby contacting and bonding to each other, and then pinching off sections of the bonded strands to form hollow, pillow shaped pieces, followed by heating the pieces to blister and set the strands. No oat cereal has a highly expanded, porous structure in which small, randomly distributed voids throughout the cereal provide the reduced bulk for a low density cereal product.

Efforts have, of course, been made to remedy this situation. A notable effort was made by Rupp, as described in U.S. Pat. No. 2,552,291, in which he taught the use of solvent extraction on dehulled oat and milled oat products to remove the oat lipids which inhibited expansion of oats and oat products. His tests indicated that substantial improvement in expansion of oats and oat products can be produced in a variety of expansion methods (in at least one test, expansion was doubled) from solvent extracted defatted oats and oat products.

Although Rupp was successful in his efforts to produce an oat cereal product with substantially improved expansion, it would also be desirable to make a highly expanded cereal by using a simple method that does not require extraction of oat lipids.

It is therefore an object of the present invention to provide a method of making light, crisp oat flour based cereal products having a highly expanded, porous structure, by a method which does not require extraction by solvents to remove oat lipids, such that the oat cereal product has a density, when measured as irregular nuggets about 3/16 to 5/16 inches in diameter, of less than about 12 ounces in a box volume of 121.5 cubic inches.

It is also an object of the present invention to provide a method for improving the expansion of expanded cereal products containing oat flour by a method which does not require extraction by solvents to remove oat lipids.

SUMMARY OF THE INVENTION

These and other objects are accomplished by the method of the present invention. We have discovered a method of making a highly expanded, porous oat cereal product comprising the steps of: (a) classifying an oat flour to separate out a low $\beta$-glucan oat flour with a $\beta$-glucan content of less than about 3.3%, (b) cooking a mix comprising the low $\beta$-glucan oat flour wherein the low $\beta$-glucan oat flour comprises at least 55% of cereal flour in the mix, (c) expanding and shaping the cooked mix into a shaped cereal product, (d) heat setting the shaped cereal product; and (e) drying the heat set cereal product to a moisture content at which it is structurally stable. The greatly improved expansion provided by the present invention is unexpected in light of the teachings of the Rupp patent since the low $\beta$-glucan oat flour used in the present invention can contain substantially the same quantities of oat lipids as whole oat flour.

DESCRIPTION OF THE DRAWINGS

FIG. 3 is a block diagram displaying in greater detail the classification steps for the exemplary embodiment of FIG. 2.

Figure 1:
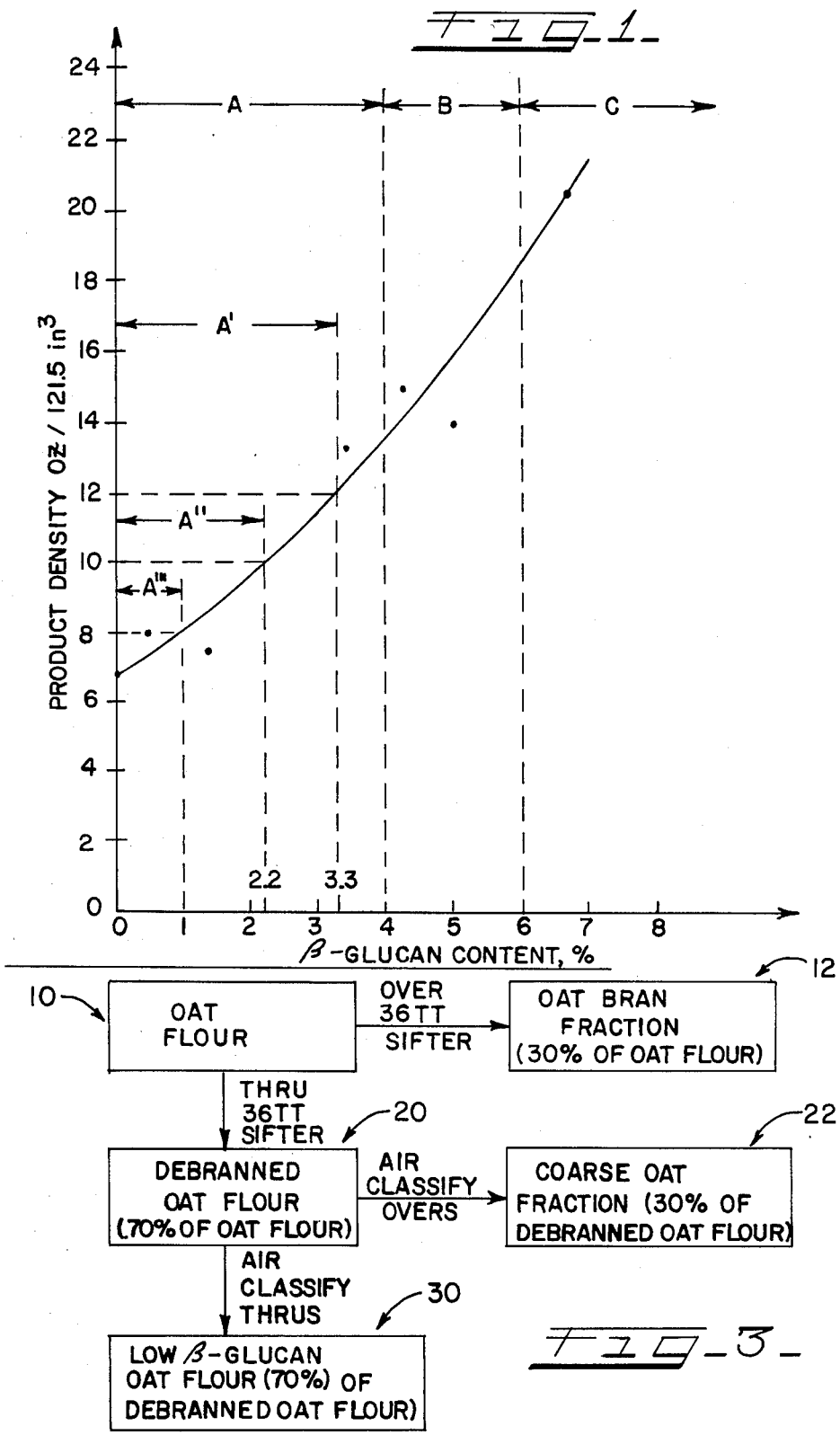
FIG. 1 is a plot displaying the product density resulting from the use of oat flours with varying $\beta$-glucan contents to make a highly expanded, porous oat cereal.

Referring to the figures in greater detail, the plot of FIG. 1 shows that when a mix of 95% oat flour and 5% sucrose is cooked, expanded and shaped in a cooker-extruder, heat set in a hot air stream and dried in an oven, products are made with densities that vary in relation to the amount of β-glucan in the oat flour used to make them. The data points shown in the plot of FIG. 1 are based on the calculated β-glucan content and the observed expansion of the test samples while the curve shown in the plot has been fitted to the data points by a standard least squares method. Other factors which can affect product densities for extruded cereals such as the moisture content of the mix or the temperature of extrusion, which are well known in the extruded cereal art, are not shown. Interval B of FIG. 1 represents a typical range for the β-glucan content in whole oat flours; 4% to 6%. Therefore, as indicated in FIG. 1, product densities in the range of about 13½ to 18½ ounces/121.5 cubic inches can be expected when using whole oat flour. Interval C of FIG. 1 represents typical β-glucan contents for coarse oat flour fractions such as oat bran flour; above 6%. Therefore, as indicated in FIG. 1, product densities above 18½ ounces/121.5 cubic inches can be expected from coarse oat flour fractions. Interval A of FIG. 1 represents a typical range for the β-glucan content in fine oat flour fractions and also oat flours that have been treated to reduce their β-glucan content; 0% to 4%. Therefore, as indicated on FIG. 1, product densities in the range of about 6½ to 13½ ounces/121.5 cubic inches can be expected from the fine oat flour fractions and oat flours that have been treated to reduce their β-glucan content. In the present invention, product densities below about 12 ounces/121.5 cubic inches are desired, corresponding to β-glucan contents below about 3.3% in the oat flour as shown by interval A' of FIG. 1. Also, product densities below about 10 ounces/121.5 cubic inches are preferred in the present invention, corresponding to β-glucan contents below about 2.2% in the oat flour as shown by interval A" of FIG. 1. Also, product densities below about 8 ounces/121.5 cubic inches are most preferred in the present invention, corresponding to β-glucan contents below about 1% in the oat flour as shown by interval A'" of FIG. 1.

Figure 2:
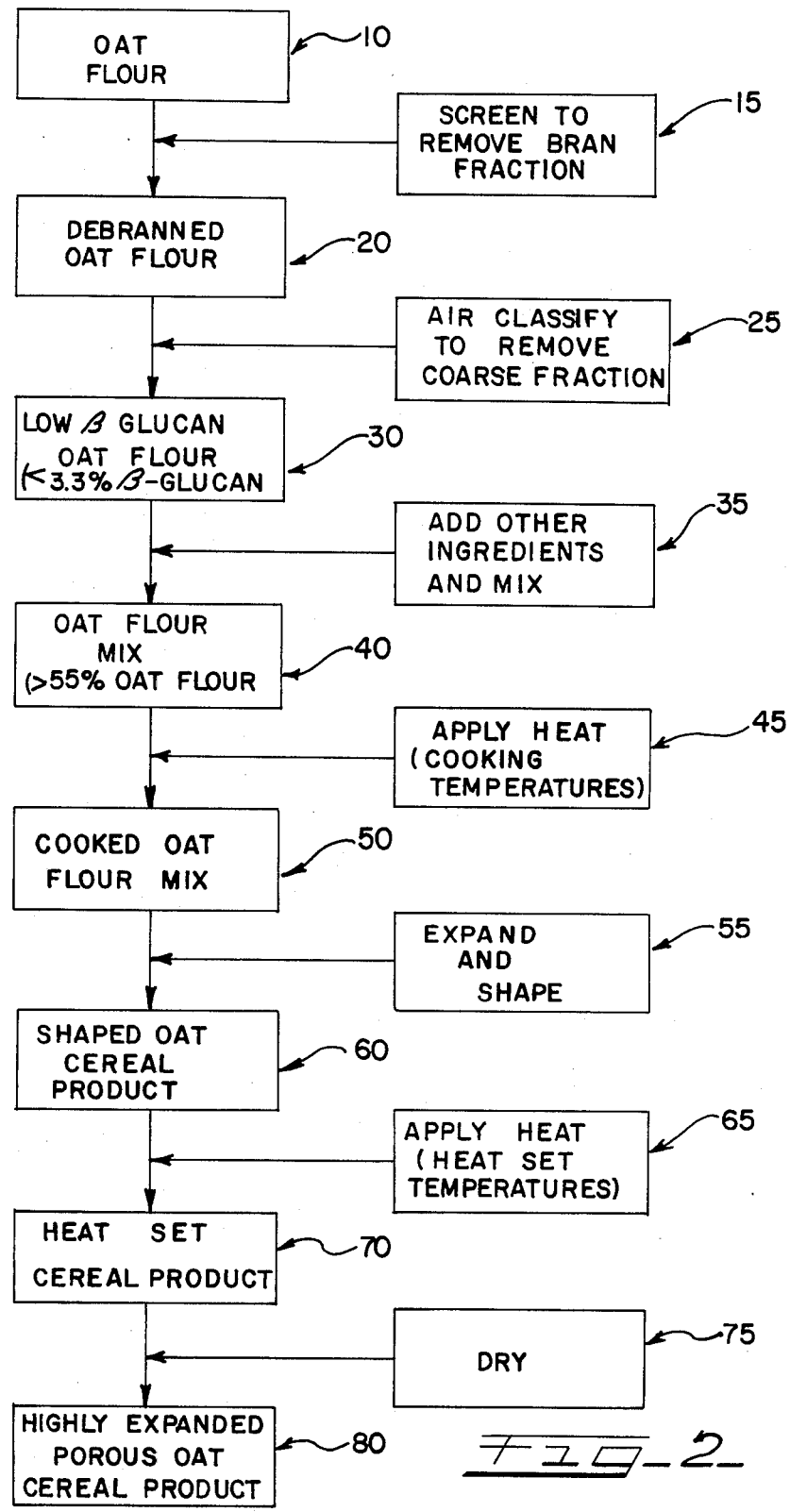
FIG. 2 is a block diagram displaying steps for an exemplary embodiment of the present invention in which the oat flour is both screened and air classified to produce a low β-glucan oat flour.

Referring in greater detail to the exemplary embodiment of FIG. 2 and the classification steps of FIG. 3, whole oat flour 10 is screened 15 to remove the bran fraction 12 of the oat bran 10. Typically, screening 15 could be used to remove about 20% to 50% of the coarsest oat flour and is shown here as removing about 30% of the coarsest oat flour, thereby removing a considerable amount of bran fiber and β-glucan from the oat flour 10 to leave a debranned oat flour 20. Here, the oat flour that remains on a 36TT (538 micron) sifter are the "overs" that comprise the oat bran fraction 12 while the oat flour that falls through the 36TT sifter are the "thrus" that comprise the debranned oat flour 20. The debranned oat flour 20 is then air classified 25 to remove an additional coarse fraction 22 of the original oat flour 10. Typically, air classification 25 can be used to remove about 30% to 70% of the debranned oat flour 20 as a coarse oat fraction 22 of the original oat flour 10 and is shown here as removing 30% of the debranned oat flour 20 as a coarse oat fraction 22, thereby leaving a low β-glucan oat flour 30 with a β-glucan content of less than 3.3%. The low β-glucan oat flour 30 can therefore typically represent about 20% to 60% of the original oat flour 10.

Referring again to FIG. 2, other ingredients such as water, additional flour, sugar, flavoring, coloring etc. can then be added and mixed 35 into the low β-glucan oat flour 30 to make an oat flour mix 40 with a low β-glucan oat flour 30 content greater than about 55% based on the total amount of cereal flour in the mix. Heat is then applied 45 to the oat flour mix to produce a cooked oat flour mix 50. A cooker-extruder of conventional construction which heats the oat flour mix 40 to about 300° F. can be used to cook the mix 40. The cooked oat flour mix 50 is then expanded and shaped 55 into a desired shape for an oat cereal product 60. Again, a cooker-extruder of conventional construction with an appropriate shaping die and cutter is satisfactory to expand and shape 55 the cooked oat flour mix 50. The shaped oat cereal product 60 is then immediately heated 65 at a temperature at which it becomes a heat-set cereal product 70 which retains its expanded shape. Temperatures of about 500° F. are generally satisfactory when applied to an extruded cereal product in a hot air stream. The heat set cereal product 70 is then dried 75 to produce the highly expanded, porous oat cereal product 80 of the present invention.

DETAILED DESCRIPTION OF THE INVENTION

While we do not wish to be bound by theories, we believe that the difficulty in expanding oats and oat flour and the unexpected success of our method is a result of the substantial amount of oat gum present in oats and oat flour. Oat gum is a water soluble fraction of the dehulled oat which is composed mainly of β-glucan and pentosan carbohydrates, with the largest portion of the fraction being β-glucan. β-glucan is a linear polymer consisting of β-(1-4) and β-(1-3) linked D-glucopyranosyl units. A principal characteristic of β-glucan is that it binds moisture strongly —so strongly, in fact, that a 1% aqueous solution of β-glucan forms a non-liquid hydrocolloid. The β-glucan content of the dehulled oat is usually 4 to 6% on a dry weight basis. We believe that under the conditions typically employed in low moisture expansion methods for cereal grains, the β-glucan binds so much of the available water that during the gelatinizatin of oat starch the amylose cannot migrate to form the hydrogen bond cross-linkages necessary to support an expanded structure. Our invention uses an oat flour with a reduced level of β-glucan, resulting in a reduction of bound moisture and greater stability in the expanded cereal.

In commercial milling practice, the dehulled oat (i.e. the oat kernel with its protective hull removed) tends to fragment through natural cleavage into three fractions, the bran, the germ, and the starchy endosperm. This cleavage cannot be made cleanly, however, and several different tissues of each fraction tend to remain aggregated. β-glucan, although distributed throughout the dehulled oat, tends to remain in greatest concentration within the oat bran fraction. Oat flour made from the germ and starchy endosperm locations will therefore be lower in β-glucan than an oat flour made from the whole dehulled oat. Mechanical processing involving steps such as rolling, grinding, sifting and air classifying are conventionally used to separate and remove the bran fraction. Generally, oat flour ground from the whole dehulled oat consists of a wide variety of particle sizes. The grinding of oat flour naturally splits apart the portions of the oat which have the least strength and leaves relatively intact those portions which consist largely of the tough, fibrous bran. Thus, the bran portion of the oat flour is predominantly in the larger flour particles. By removing the larger flour particles, much of the fibrous bran and $\beta$-glucan can be removed from the oat flour, leaving a low $\beta$-glucan oat flour suitable for use in the present invention.

To carry out the method of the present invention, it is therefore necessary to classify an oat flour to separate out a low $\beta$-glucan oat flour. By "oat flour" we mean a finely granulated product produced by grinding dehulled oats. By "classify" we mean to separate the flour particles into at least two classes of differing particle size. Methods for classifying particles of cereal flour are well known in the cereal milling art and include, for example, the use of screens and air classifiers. Methods for classifying particles of cereal flour can also include the use of multiple classification stages whereby successive coarse flour particle sizes are removed. Removal of the coarse flour particles leaves a fine residue of the original oat flour which is the low $\beta$-glucan oat flour used in the present invention.

Other, less widely used methods of classification can also be used. For example, in U.S. Pat. No. 4,211,801 issued to Oughton, oat flour is classified into separate "gum-free" flour and bran portions by mixing oat flour with hexane and allowing the larger bran particles to settle out while the "gum-free" flour portion remains suspended in the hexane. Thus, application of Stoke's law principles in which the fine fraction of oat flour remains in suspension in a liquid carrier can also provide the classification required in the present method. We have found in the practice of the present invention that a low $\beta$-glucan oat flour with a $\beta$-glucan content of less than about 3.3% provides a significant improvement in expansion for an expanded oat cereal product while even greater expansion improvement occurs at $\beta$-glucan levels below about 2.2% and below about 1%. In the method of the present invention, therefore, the oat flour is classified to separate out a low $\beta$-glucan oat flour with a $\beta$-glucan content of less than about 3.3% and preferably less than about 2.2% and most preferably less than about 1%.

"$\beta$-glucan content" of oat flour is determined by a measurement of the $\beta$-glucan extracted by alkali from oat flour in 3 successive extractions either by the difference technique or by the calcofluor die technique described by P. J. Wood and J. Weisz in "Use of Calcofluor in Analysis of Oat Beta-D-glucan" Cereal Chemistry Vol. 61, No. 1 (1984).

The low $\beta$-glucan oat flour is then made into a mix with water and with other ingredients desired to improve the taste, appearance, texture, and/or storage stability of the oat cereal product. For example, sugar, salt, flavoring, coloring and/or preservatives can be added. Also, additional cereal flour such as corn flour, oat flour, wheat flour, rice flour and combinations thereof can be added. The improvement in expansion provided by the present invention is, however, greatest and therefore preferred where at least about 55% and most preferably at least about 80% of cereal flour in the mix is the low $\beta$-glucan oat flour.

The mix provided by the mixture of low $\beta$-glucan oat flour, water and other ingredients as described above can provide an expanded product at moisture contents in a wide range. When using a high percentage of the low $\beta$-glucan oat flour in the mix, however, a moisture content in the range of about 25% to 40% by weight is preferred to produce a highly expanded product and a moisture content in the range of about 33% to 40% is most preferred to produce the greatest product expansion. Conventional methods for admixing water with cereal flour can be used to bring the moisture to an appropriate level, including, for example, agitating the flour and water in a ribbon mixer or by injecting water into low moisture ingredients inside a screw-type extruder.

The mix, or low moisture ingredients for making the mix is then cooked sufficiently to gelatinze the starch therein, shaped into a desirable configuration such as hearts, cones, pillows, circles or simply irregular nuggets of a particular size, and then expanded either before or after shaping into a porous structure, thereby making an expanded cereal product. Although many methods for cereal cooking, shaping and expanding are known and can be practiced in the present invention such as those employing pelletizers, rolls, puffing guns and the like, a preferred means for accomplishing these steps is to employ a conventional screw-type cooker-extruder. In the extruder, the mix is urged by the rotation of the screw or screws of the extruder through the extruder and toward a shaping die at a discharge end of the extruder. During its progress through the extruder, the mix becomes a plastic mass which is worked and heated to cooking temperatures exceeding 212° F. which are well known in the expanded cereal art, preferably to temperatures in the range of about 290° F. to 340° F., and is maintained therein at superatmospheric pressure. The plastic mass then reaches the discharge end of the extruder in a cooked state where it is expressed through the shaping die and expanded by the expansion of entrapped gases and superheated liquid (especially superheated water) within the plastic mass. The resulting expanded extrudate is then cut to a desired size, thereby making an expanded, shaped cereal product. The operation of the screw-type cooker-extruder as described above is therefore conventional and well known in the extruded cereal art.

The shaped, expanded cereal product must then be subjected to a heat setting process immediately after it is shaped and expanded or simultaneously as it is shaped and expanded in order to stabilize its expanded structure. The heat setting process causes rapid drying which provides a substantially stable expanded structure. Drying to below about 15% moisture can be adequate although drying to below about 10% moisture is preferred to insure adequate stability. For example, a hot air stream applied for a brief period to the cereal product can provide sufficient rapid drying to stabilize the expanded structure. While the air temperature and duration required for this heat setting process will necessarily vary according to the size and shape of the cereal product, it has been found that hot air of at least about 430° F. applied to the cereal product in a fast moving air stream for about 1 to 3 seconds can adequately heat-set an irregular nugget shaped cereal product of about 3/16" to 5/16" in diameter. Higher temperatures are desirable to maintain greater product expansion although temperatures above about 560° F. can cause an undesirable darkening of the product.

Although the heat-setting process causes substantial drying of the cereal product, the remaining moisture in the cereal product can still cause a slow but a significant shrinkage of the cereal product and therefore a reduction in the volume of the final product. To preserve the greatest product expansion, therefore, the heat-set cereal product is immediately dried. Drying the heat-set cereal product in an oven of conventional design is a satisfactory drying method. A fluidized bed type oven is preferred. While the air temperature and duration for oven drying the heat-set cereal product will necessarily vary according to the size and shape of the cereal product and its moisture content, it has been found that an oven temperature in the range of about 335° F. to 400° F. applied to the heat-set cereal product for about 1 to 2 minutes is satisfactory to dry an extruded, irregular nugget shaped cereal product of about 3/16" to 5/16" in diameter to a moisture content at which the heat set cereal product retains its fully expanded structure and is therefore structurally stable. A moisture content of about 5% is satisfactory and a moisture content of about 2-4% is preferred.

In a preferred embodiment of the invention, a low $\beta$-glucan oat flour is separated from a commercially available oat flour by screening and air classification such that about 35% to 60% of the oat flour consisting of the coarsest particles are removed, thereby leaving a low $\beta$-glucan oat flour representing about 40% to 65% of the oat flour which has a $\beta$-glucan content of less than about 2.2% and most preferably less than about 1%. The low, -glucan oat flour is then admixed with about 5 percent by weight of sucrose and also with water to make a moist oat flour mix a with moisture content of about 25-40% and most preferably a moisture content of 33-40%. The mix is then fed into a screw-type cooker-extruder of conventional construction. The mix is therein cooked at a temperature of about 290° F. to 340° F. and most preferably at a temperature of about 320° F., and the resulting plastic mass is then shaped by a shaping die and discharged from the die at superatmospheric pressure. The extruded plastic mass, having a substantial amount of superheated water trapped within it, then expands suddenly as it is discharged into the atmosphere, thereby making an expanded, shaped cereal extrudate. The cereal extrudate is then further shaped by cutting it with a knife of conventional design at the die, severing it into small expanded pellets. The resulting shaped, expanded cereal product is then immediately heat-set in a high temperature air stream at a temperature in the range of about 430° F. to 560° F. and most preferably about 505° F. for a duration of about 1 to 3 seconds and is then immediately transferred to a conventional drying oven where it is dried and toasted at a temperature in the range of about 335° F. to 400° F. for about 1 to 2 minutes.

The following example illustrates and explains the invention but is not to be taken as limiting the invention in any regard. Also, in the above description and following example of the invention, the following unit of measure conventions are to be applied. Unless otherwise stated, percent means a weight percent. Unless otherwise stated, degree means degrees Fahrenheit. Unless otherwise stated, densities of cereal products are stated on a weight per unit volume basis with a standard box volume of 121.5 cubic inches and a weight in ounces.

EXAMPLE

Classification of oat flour to separate out various flour fractions was undertaken in two stages. In the first stage, #36 oat flour was screened on a 36TT (538 micron) sifter to remove the bran portion of the flour. About 30% of the oat flour was thereby removed as a bran portion and about 70% of the oat flour was therefore a first fine flour fraction, designated herein as fraction A. Fraction A was then subjected to additional classification in an air classifier. The air classifier was first set to separate out a fine flour fraction from about 70% of fraction A; generally flour particles that would pass through a 200 mesh screen, designated herein as fraction B. The approximately 30% of fraction A that was the coarse fraction separated by the air classifier is designated herein as fraction C. The air classifier was then set to separate out a fine flour fraction from about 30% of fraction A; generally flour particles that would pass through a 300 mesh screen, designated herein as fraction D. The approximately 70% of fraction A that was the coarse flour fraction separated by the air classifier is designated herein as fraction E. The resulting fractions are listed in Table 1. Particle sizes for the flour and fractions A-E are cited in Table 2. Fiber, fat and an estimate of $\beta$-glucan as calculated from the crude fiber content, for the flour and fractions A-E are cited in Table 3. Substantial reductions in the amount of $\beta$-glucan in the cereal flour were therefore accomplished by classification.

The flour and fractions A-E were each used in separate trials to make expanded oat cereal products. The flour and flour fractions were admixed with sucrose to a mix of 95% flour or flour fraction and 5% sucrose and were then admixed with water in a conventional paddle blender to make a mix with a moisture content of 35%. The mix was then fed from the paddle blender into a 2½" diameter Egan single screw extruder where it was cooked, shaped and expanded at a temperature of about 325° F. The resulting shaped, expanded cereal product was then immediately heat-set in a hot air stream at a temperature of about 500°-510° F. for the short period necessary to convey it in the hot air stream through a cyclone separator and to a Jeffry fluidized bed oven. The heat-set cereal product was then dried and toasted in the Jeffry oven at 350°-375° F. to a moisture content of about 5%. The resulting cereal product was then transferred to a Proctor & Schwartz convection oven where it was additionally dried at 350°-375° F. to a final moisture of 2-4%.

The resulting product characteristics are shown in Table 4. Products made with fine flour fractions B and D represent the practice of the present invention, while products made with the unclassified oat flour and flour fractions A, C and E are outside the practice of the present invention. The use of a low $\beta$-glucan oat flours therefore produced a significant improvement in product density and porosity.

TABLE 1

| Sample | Classification | Fraction | % of Original Flour |
| --- | --- | --- | --- |
| Flour | None | | 100 |
| Fraction A | Screening | Fine | 70 |
| Fraction B* | Screening and Air Classification | Fine | 49 |
| Fraction C | Screening and Air Classification | Coarse | 21 |
| Fraction D* | Screening and Air Classification | Fine | 21 |
| Fraction E | Screening and | Coarse | 49 |

TABLE 1-continued

| Sample | Classification | Fraction | % of Original Flour |
|---|---|---|---|
| | Air Classification | | |

*Low β-glucan oat flour in accordance with the present invention.

TABLE 2

| Sample | % On 50 Mesh | % On 100 Mesh | % On 200 Mesh | % On 400 Mesh | % Thru 400 Mesh |
|---|---|---|---|---|---|
| Flour | 21 | 13 | 9 | 15 | 42 |
| Fraction A | 12.5 | 13.5 | 9 | 14 | 51 |
| Fraction B* | — | 1 | 6 | 13 | 80 |
| Fraction C | 43 | 36 | 13.5 | 0.5 | 7 |
| Fraction D* | — | — | 1 | 6.5 | 92.5 |
| Fraction E | 16 | 19 | 13 | 7 | 35 |

*Low β-glucan oat flour in accordance with the present invention.

TABLE 3

| Sample | % Crude Fiber | % Insoluble Dietary Fiber | % Fat | % β-Glucan |
|---|---|---|---|---|
| Flour | 1.25 | 6.86 | 8.7 | 4.3 |
| Fraction A | 1.09 | 5.26 | 8.7 | 3.5 |
| Fraction B* | 0.58 | 2.08 | 8.1 | 1.4 |
| Fraction C | 1.80 | 15.92 | 10.1 | 6.7 |
| Fraction D* | 0.38 | 0.88 | 8.0 | .6 |
| Fraction E | 1.40 | 6.47 | 9.1 | 5.0 |

*Low β-glucan oat flour in accordance with the present invention.

TABLE 4

| Sample | Product Density 0z./121.5 in³ | Product Description |
|---|---|---|
| Flour | 14–16 | Not porous |
| Fraction A | 13–14½ | Slightly porous |
| Fraction B* | 7½ | Very porous |
| Fraction C | 20¾ | Not porous |
| Fraction D* | 8 | Very porous |
| Fraction E | 14 | Slightly porous |

*Low β-glucan oat flour in accordance with the present invention.

Although the above description and example of the invention are disclosed herein for the purpose of describing the invention to those with ordinary skill in the art, each and every modification and variation of the invention is not described in detail. It is intended, however, that all modifications and variations are to be included within the scope of the invention.

We claim:

1. A method of making a highly expanded, porous oat cereal product comprising the steps of:
    a. classifying an oat flour by separating particles of the flour into at least two classes of differing particle size to separate out a particle size having a low beta-glucan oat flour with a beta-glucan content of less than about 3.3%;
    b. cooking a cereal flour mix comprising the low beta-glucan oat flour in a cooker-extruder wherein the low beta-glucan oat flour comprises at least about 55% of cereal flour in the mix and the mix has a moisture content of about 25% to 40%;
    c. expanding and shaping the cooked mix into a shaped cereal product by expressing the mix from the cooker-extruder under expanding conditions;
    d. immediately heat setting the expanded, shaped cereal product; and
    e. drying the heat set cereal product to a moisture content at which is is structurally stable to obtain a porous oat cereal product having a density or below about 12 ounces per 121.5 cubic inches.

2. The method of claim 1 wherein the low β-glucan oat flour has a β-glucan content of less than about 2.2%.

3. The method of claim 1 wherein the mix low β-glucan oat flour comprises at least about 80% of cereal flour in the mix.

4. The method of claim 1 wherein the mix is cooked and expanded at a temperature in the range of about 290° F. to 340° F.

5. The method of claim 1 wherein the shaped cereal product is heat-set in a hot air stream.

6. The method of claim 1 wherein the shaped cereal product is heat-set at a temperature above about 430° F.

7. The method of claim 1 wherein the dried cereal product has a moisture content of less than about 5%.

* * * * *